(12) United States Patent
Ting et al.

(10) Patent No.: US 12,704,677 B2
(45) Date of Patent: Aug. 11, 2026

(54) OPTOELECTRONIC PACKAGE

(71) Applicant: Advanced Semiconductor Engineering, Inc., Kaohsiung (TW)

(72) Inventors: Chun-Yen Ting, Kaohsiung (TW); Hung-Chun Kuo, Kaohsiung (TW); Jung Jui Kang, Kaohsiung (TW); Chiu-Wen Lee, Kaohsiung (TW); Shih-Yuan Sun, Kaohsiung (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 384 days.

(21) Appl. No.: 18/135,075

(22) Filed: Apr. 14, 2023

(65) Prior Publication Data

US 2024/0345315 A1 Oct. 17, 2024

(51) Int. Cl.
*G02B 6/122* (2006.01)
*G02B 6/12* (2006.01)

(52) U.S. Cl.
CPC ....... *G02B 6/1225* (2013.01); *G02B 6/12002* (2013.01); *G02B 2006/12147* (2013.01)

(58) Field of Classification Search
None
See application file for complete search history.

(56) References Cited

U.S. PATENT DOCUMENTS 6,435,733 B1 * 8/2002 Parat .................... G02B 6/4249 385/88
6,626,585 B1 * 9/2003 Malone .................. G02B 6/423 385/88
8,265,432 B2 * 9/2012 Doany ................. G02B 6/4206 257/434
8,755,644 B2 * 6/2014 Budd .................. G02B 6/4206 438/31
2002/0025122 A1 * 2/2002 Ouchi ................. G02B 6/4249 385/88
2006/0251360 A1 * 11/2006 Lu ........................ G02B 6/4292 385/88
2009/0226130 A1 * 9/2009 Doany ................. G02B 6/4246 385/14
2010/0322551 A1 * 12/2010 Budd .................. G02B 6/4206 438/31
2013/0266255 A1 * 10/2013 Tan .......................... G02B 6/42 385/14
2023/0054600 A1 2/2023 Lin et al.

OTHER PUBLICATIONS

U.S. Appl. No. 17/838,099, filed Jun. 10, 2022, Yen et al.

* cited by examiner

*Primary Examiner* — Jerry Rahll
(74) *Attorney, Agent, or Firm* — Foley and Lardner LLP

(57) ABSTRACT

An optoelectronic package is provided. The optoelectronic package includes a photonic structure, an alignment component and a light transmission element. The photonic structure includes an optical I/O. The alignment component includes a through hole extending through the alignment component and aligned with the optical I/O of the photonic structure. The light transmission element entirely fills the through hole of the alignment component.

7 Claims, 10 Drawing Sheets

OPTOELECTRONIC PACKAGE

BACKGROUND

1. Field of the Disclosure

The present disclosure relates to an optoelectronic package, and to an optoelectronic package including an alignment component.

2. Description of the Related Art

Silicon photonics has the advantages of high transmission rate and low power consumption, and its application prospects in optical communication are promising, such as servers, laser radars (Lidar), etc. Coupling optical fibers and optical communication chips in optical transceiver terminals usually need accurate alignment. However, alignment processes between the optical fibers and the optical communication chips are difficult to handle, resulting in increased loss of optical signals. With the increasing demand for bandwidth and miniaturization, the alignment between the optical fiber and the optical communication chip becomes more critical.

SUMMARY

In some embodiments, an optoelectronic package includes a photonic structure, an alignment component and a light transmission element. The photonic structure includes an optical I/O. The alignment component includes a through hole extending through the alignment component and aligned with the optical I/O of the photonic structure. The light transmission element entirely fills the through hole of the alignment component.

In some embodiments, an optoelectronic package includes a photonic structure and an alignment component. The photonic structure includes an optical I/O. The alignment component includes a light transmission channel aligned with the optical I/O of the photonic structure through a plurality of alignment pads.

In some embodiments, an optoelectronic package includes a photonic structure and an alignment component. The photonic structure includes an optical I/O. The alignment component includes a light transmission channel configured to self-align with the optical I/O of the photonic structure during a reflow process.

BRIEF DESCRIPTION OF THE DRAWINGS

Aspects of some embodiments of the present disclosure are readily understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1:
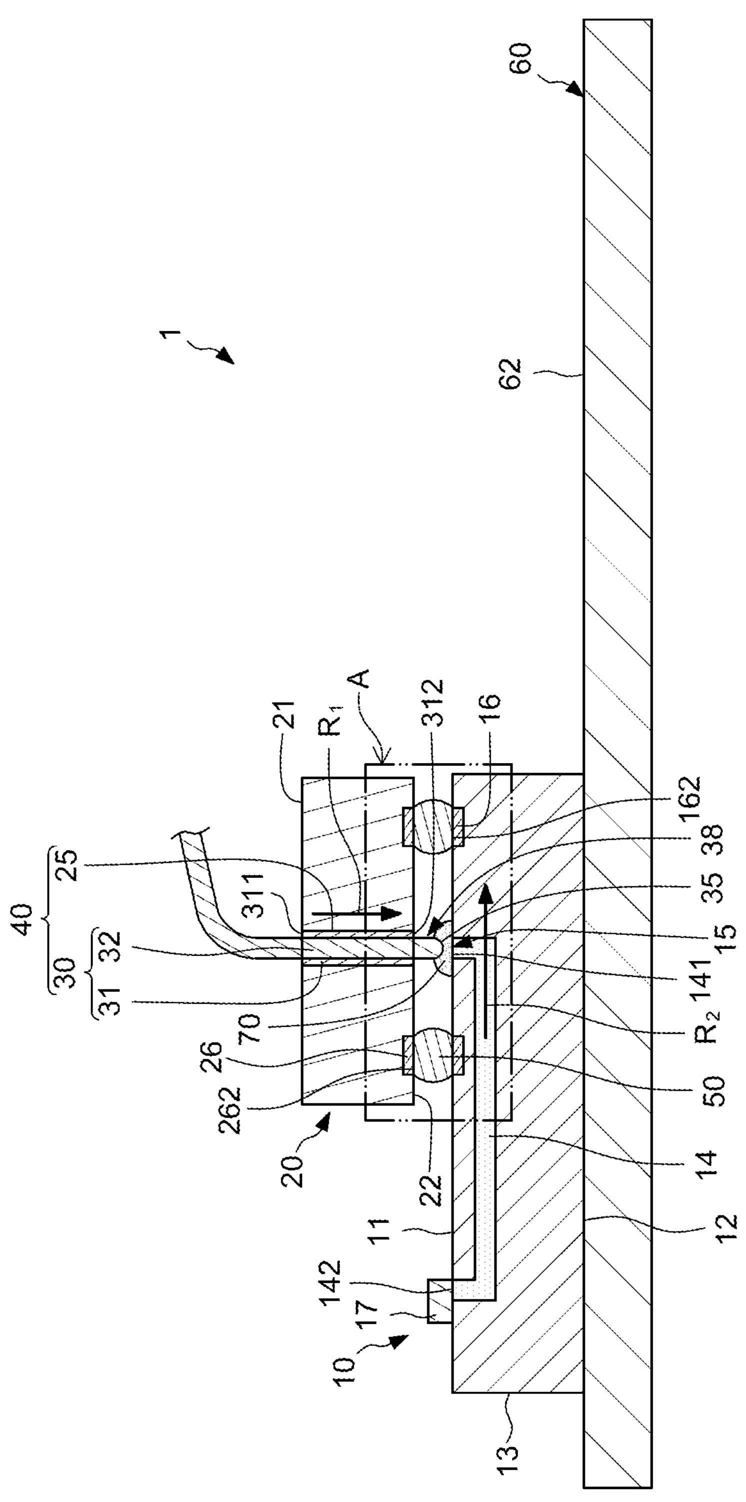
FIG. 1 illustrates a cross-sectional view of an optoelectronic package according to some embodiments of the present disclosure.

Common reference numerals are used throughout the drawings and the detailed description to indicate the same or similar components. Embodiments of the present disclosure will be readily understood from the following detailed description taken in conjunction with the accompanying drawings.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Figure 2:
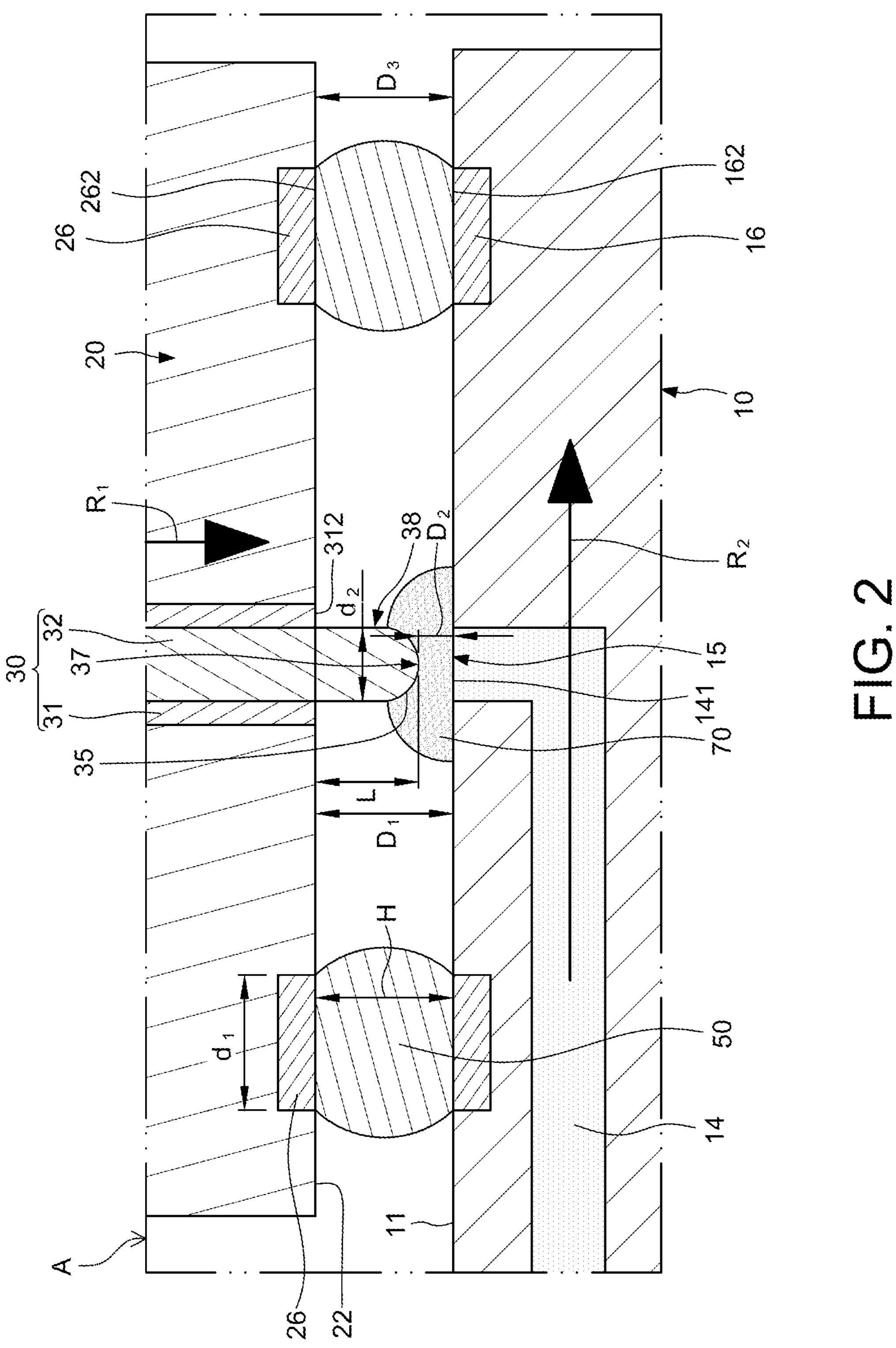
FIG. 2 illustrates an enlarged view of an area “A” of FIG. 1.
Figure 3:
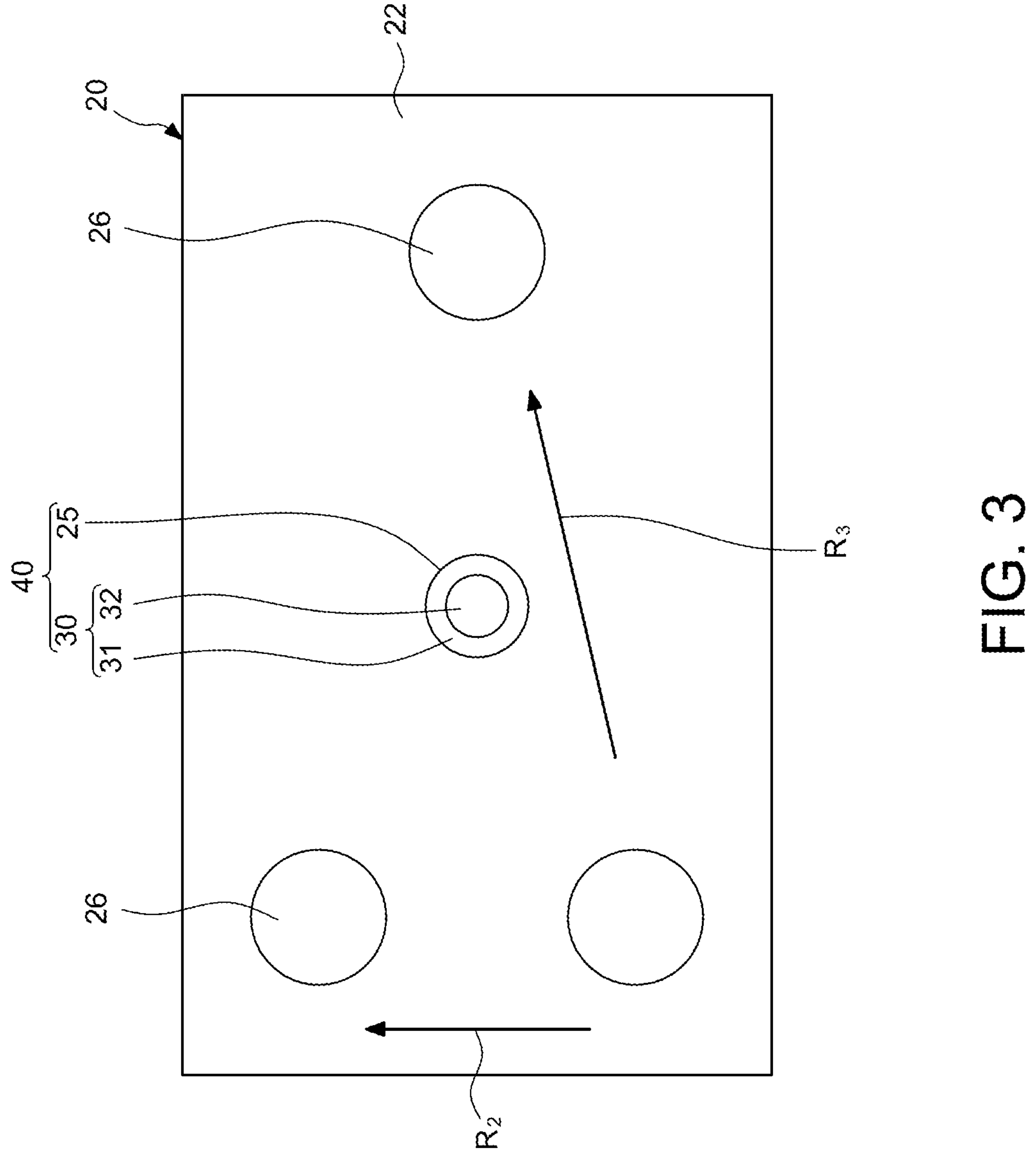
FIG. 3 illustrates a bottom view of an alignment component according to some embodiments of the present disclosure.

FIG. 1 illustrates a cross-sectional view of an optoelectronic package 1 according to some embodiments of the present disclosure. FIG. 2 illustrates an enlarged view of an area “A” of FIG. 1. FIG. 3 illustrates a bottom view of an alignment component 20 according to some embodiments of the present disclosure. The optoelectronic package 1 includes a photonic structure 10, an alignment component 20, a light transmission element 30, a plurality of connectors 50, a coupling material 70 and a carrier 60. In some embodiments, the optoelectronic package 1 may be, for example, an optical communication device.

The photonic structure 10 may be, for example, a silicon photonic structure. The photonic structure 10 may have an upper surface 11, a lower surface 12 opposite to the upper surface 11 and a lateral surface 13 extending between the upper surface 11 and the lower surface 12. The photonic structure 10 may include a waveguide 14, an optical I/O 15, a plurality of bonding pads 16 and an optoelectronic component 17. The waveguide 14 may be configured to transmit an optical signal. In some embodiments, as sown in FIG. 1, the waveguide 14 may have a first port 141 and a second port 142 opposite to the first port 141. The first port 141 and the second port 142 may be exposed from the upper surface 11 and configured to couple the optical signal. The waveguide 14 may be embedded in the photonic structure 10, and may be disposed adjacent to the upper surface 11.

The optical I/O 15 may be disposed at the first port 141 of the waveguide 14 and configured to input or output the optical signal. In some embodiments, the optical I/O 15 may also be referred to as "input/output (I/O) port" or "optical receive region." In some embodiments, the optical I/O 15 may be the first port 141 of the waveguide 14. In some embodiments, the optical I/O 15 may be, for example, a flat surface or a curved surface.

The plurality of bonding pads 16 may be disposed adjacent to the upper surface 11 of the photonic structure 10. In some embodiments, as shown in FIG. 2, the plurality of bonding pads 16 may be exposed from the upper surface 11 of the photonic structure 10. In some embodiments, top surfaces 162 of the plurality of bonding pads 16 may be substantially coplanar with the first port 141 of the waveguide 14 and the optical I/O 15. In some embodiments, the plurality of bonding pads 16 may surround or may be disposed around the optical I/O 15.

As shown in FIG. 1, the optoelectronic component 17 may be, for example, a laser diode (LD) or a photodetector (PD). In some embodiments, the optoelectronic component 17 may be coupled with the second port 142 of the waveguide 14. In some embodiments, the optoelectronic component 17 (e.g., the LD) may be configured to emit the optical signal into the waveguide 14 from the second port 142. In some embodiments, the optoelectronic component 17 (e.g., the PD) may be configured to receive the optical signal from the second port 142 of the waveguide 14.

The alignment component 20 may be, for example, a semiconductor die. The semiconductor die may be, for example, a function die with electrical function or a dummy die without electrical function. The alignment component 20 may be located over the photonic structure 10. In some embodiments, as shown in FIG. 1, the alignment component 20 may be electrically connected and physically connected to the photonic structure 10 through the plurality of connectors 50. In some embodiments, the plurality of connectors 50 may also be referred to as "reflowable elements." In some embodiments, the plurality of connectors 50 may be, for example, solder balls or conductive pillars. In some embodiments, the plurality of connectors 50 may include a reflowable material. The alignment component 20 may have an upper surface 21, a lower surface 22 and a through hole 25. The lower surface 22 is opposite to the upper surface 21. The through hole 25 may extend through the alignment component 20 and in communication with the upper surface 21 and the lower surface 22. In some embodiments, as shown in FIG. 2, the alignment component 20 may include a plurality of alignment pads 26. The plurality of alignment pads 26 may be disposed adjacent to the lower surface 22 of the alignment component 20. In some embodiments, the plurality of alignment pads 26 may be located on and exposed from the lower surface 22 of the alignment component 20. In some embodiments, as shown in FIG. 2, the plurality of alignment pads 26 may be arranged in a second direction $R_2$. The second direction $R_2$ may be substantially parallel to the lower surface 22 of the alignment component 20. In some embodiments, as shown in FIG. 3, the plurality of alignment pads 26 may be further arranged in a third direction $R_3$ different from the second direction $R_2$. The third direction $R_3$ may not be perpendicular to the second direction $R_2$. Thus, the plurality of alignment pads 26 in the second direction $R_2$ and the plurality of alignment pads 26 in the third direction $R_3$ may define a position on a plane to facilitate alignment. In some embodiments, the plurality of connectors 50 may connect the plurality of alignment pads 26 of the alignment component 20 to the upper surface 11 of the photonic structure 10. In some embodiments, an amount of the plurality of alignment pads 26 may be greater than or equal to 3 to constitute an alignment plane, which may be equal to an amount of the plurality of bonding pads 16 of the photonic structure 10. A size of the alignment pad 26 the alignment component 20 may be substantially equal to a size of the bonding pad 16 of the photonic structure 10. A location of the alignment pad 26 the alignment component 20 may correspond to a location of the bonding pad 16 of the photonic structure 10. In some embodiments, the plurality of connectors 50 may connect the plurality of alignment pads 26 of the alignment component 20 and the plurality of bonding pads 16 of the photonic structure 10. In some embodiments, bottom surfaces 262 of the plurality of alignment pads 26 may be substantially coplanar with the lower surface 22 of the alignment component 20. In some embodiments, the through hole 25 may be aligned with the optical I/O 15 of the photonic structure 10 through the plurality of alignment pads 26 during a reflow process due to a cohesion force of a reflowable material of the plurality of connectors 50. In some embodiments, at least one of the plurality of alignment pads 26 may be electrically insulated. In some embodiments, from a cross-sectional view, a width of the through hole 25 may be greater than a width of the optical I/O 15 and a width of the first port 141 of the waveguide 14.

In some embodiments, as shown in FIG. 1, the light transmission element 30 may entirely or completely fill the through hole 25 of the alignment component 20. Thus, the light transmission element 30 and the through hole 25 of the alignment component 20 may constitute a light transmission channel 40. The alignment component 20 may fix the light transmission channel 40 and align the light transmission channel 40 with the optical I/O 15 of the photonic structure 10 in a first direction $R_1$. The first direction $R_1$ may be different from the second direction $R_2$ and the third direction $R_3$. In some embodiments, the first direction $R_1$ may be substantially perpendicular to the second direction $R_2$ and the third direction $R_3$. In some embodiments, the light transmission channel 40 (including, for example, the light transmission element 30 and the through hole 25 of the alignment component 20) may be configured to self-align with the optical I/O 15 of the photonic structure 10 through the plurality of alignment pads 26 on the alignment component 20 during the reflow process due to the cohesion force of the reflowable material of the plurality of connectors 50. In some embodiments, a heat resistance temperature of the light transmission element 30 of the light transmission channel 40 may be greater than a reflow temperature of the reflow process and a melting point of the plurality of connectors 50. Thus, the light transmission element 30 of the light transmission channel 40 remains solid state during the reflow process. In some embodiments, the plurality of alignment pads 26 may be around the light transmission channel 40.

In some embodiments, as shown in FIG. 1, the light transmission element 30 may include a filling material 31, an optical fiber 32 and a light communication port 35. The filling material 31 may be in the through hole 25 of the alignment component 20. The filling material 31 may be, for example, a transparent glue material. The filling material 31 may have a top surface 311 and a bottom surface 312 opposite to the top surface 311. In some embodiments, the top surface 311 of the filling material 31 may be substantially aligned with the upper surface 21 of the alignment component 20. The bottom surface 312 of the filling material 31 may be substantially aligned with the lower surface 22 of the alignment component 20. The optical fiber 32 may extend through the filling material 31 and aligned with the optical I/O 15 of the photonic structure 10. In some embodiments, the plane defined by the plurality of alignment pads 26 in the second direction $R_2$ and the plurality of alignment pads 26 in the third direction $R_3$ may improve the alignment of the optical fiber 32. In some embodiments, the optical fiber 32 may be fixed in the through hole 25 of the alignment component 20 through the filling material 31. Thus, the filling material 31 may be interposed between an outer surface of the optical fiber 32 and a sidewall of the through hole 25. In some embodiments, a refractive index of the filling material 31 may be less than a refractive index of a core material of the optical fiber 32 so as to keep a condition of total internal reflection. In some embodiments, the refractive index of the filling material 31 may be less than or equal to a refractive index of a cladding material of the optical fiber 32 so as to maintain the condition of total internal reflection. In some embodiments, a volume of the filling material 31 may be less than a volume of the optical fiber 32 in the through hole 25.

The light communication port 35 may be located outside the through hole 25 of the alignment component 20 and aligned with the optical I/O 15 of the photonic structure 10. In some embodiments, the light communication port 35 may be an end portion of the optical fiber 32 adjacent to the optical I/O 15 of the photonic structure 10. In some embodiments, the light communication port 35 may be, for example, a flat surface or a curved surface. In some embodiments, the light communication port 35 may be an optical surface from which light leaves or enters the light transmission element 30. In some embodiments, the optical surface may be an interface between different refractive indices. In some embodiments, the optical surface may be a boundary between two optical media with different refractive indices. In some embodiments, as shown in FIG. 2, a vertical distance $D_2$ between the light communication port 35 and the optical I/O 15 may be less than a vertical distance $D_1$ between the lower surface 22 of the alignment component 20 and the upper surface 11 of the photonic structure 10 and a vertical distance $D_3$ from the bottom surfaces 262 of the plurality of alignment pads 26 to the upper surface 11 of the photonic structure 10. In some embodiments, a lens structure 37 may be formed or disposed on the light communication port 35 to increase a light coupling efficiency between the light communication port 35 and the optical I/O 15. In some embodiments, the lens structure 37 may be a hemisphere. In some embodiments, a coupling manner between the light communication port 35 and the optical I/O 15 may be, for example, grating coupling (e.g., using a grating coupler) or direct coupling. In some embodiments, the grating coupler (not shown) may be formed or disposed on the light communication port 35. In some embodiments, the grating coupler (not shown) may be formed or disposed on the optical I/O 15.

In some embodiments, as shown in FIG. 2, the plurality of connectors 50 may be around the light communication port 35. In some embodiments, an elevation of the light communication port 35 may be lower than elevations of top surfaces of the plurality of connectors 50. In some embodiments, the elevation of the light communication port 35 may be between the elevations of top surfaces of the plurality of connectors 50 and elevations of bottom surfaces of the plurality of connectors 50. In some embodiments, the elevation of the light communication port 35 may be lower than elevations of the plurality of alignment pads 26. In some embodiments, the elevation of the light communication port 35 may be between the lower surface 22 of the alignment component 20 and the upper surface 11 of the photonic structure 10. In some embodiments, a diameter $d_1$ of one of the plurality of alignment pads 26 may be greater than a diameter $d_2$ of the light communication port 35. In some embodiments, the diameter $d_1$ of one of the plurality of alignment pads 26 may be less than the diameter $d_2$ of the light communication port 35.

In some embodiments, as shown in FIG. 2, the light transmission element 30 may further include an extending portion 38. The light communication port 35 may be one end of the extending portion 38. The extending portion 38 may protrude downward from the lower surface 22 of the alignment component 20. Thus, the light communication port 35 may extend beyond the lower surface 22 of the alignment component 20. The optical fiber 32 may extend through the alignment component 20. In some embodiments, a length L of the extending portion 38 may be less than heights H of the plurality of connectors 50. Thus, there may be a gap between the light communication port 35 and the optical I/O 15. The light communication port 35 may not contact the optical I/O 15.

The coupling material 70 may be, for example, an index matching material. The coupling material 70 may be a glue, and may be disposed between the light communication port 35 and the optical I/O 15 of the photonic structure 10 to adhere the light communication port 35 and the optical I/O 15. The coupling material 70 may increase the light coupling efficiency between the light communication port 35 and the optical I/O 15. In some embodiments, as shown in FIG. 2, the coupling material 70 may cover the light communication port 35 and the optical I/O 15 to isolate a portion of the light communication port 35 and the optical I/O 15 from the air. In some embodiments, the coupling material 70 may be omitted.

In some embodiments, as shown in FIG. 1, the carrier 60 may be configured to receive the photonic structure 10. In some embodiments, the photonic structure 10 may be disposed on a first surface (e.g., a top surface) 62 of the carrier 60. In some embodiments, the light transmission element 30 in the through hole 25 of the alignment component 20 may be substantially perpendicular to the first surface (e.g., the top surface) 62 of the carrier 60.

In the embodiment illustrated in FIG. 1 to FIG. 3, the light transmission channel 40 (including, for example, the light transmission element 30 and the through hole 25 of the alignment component 20) can be aligned with the optical I/O 15 of the photonic structure 10 through the plurality of alignment pads 26 during the reflow process, lead to increased light coupling efficiency between the light communication port 35 of the light transmission channel 40 and the optical I/O 15 of the photonic structure 10 and decreased loss of the optical signal. In the optoelectronic package 1, the electrical signal may be transmitted between the photonic structure 10 and the alignment component 20 through the connectors 50.

Figure 4:
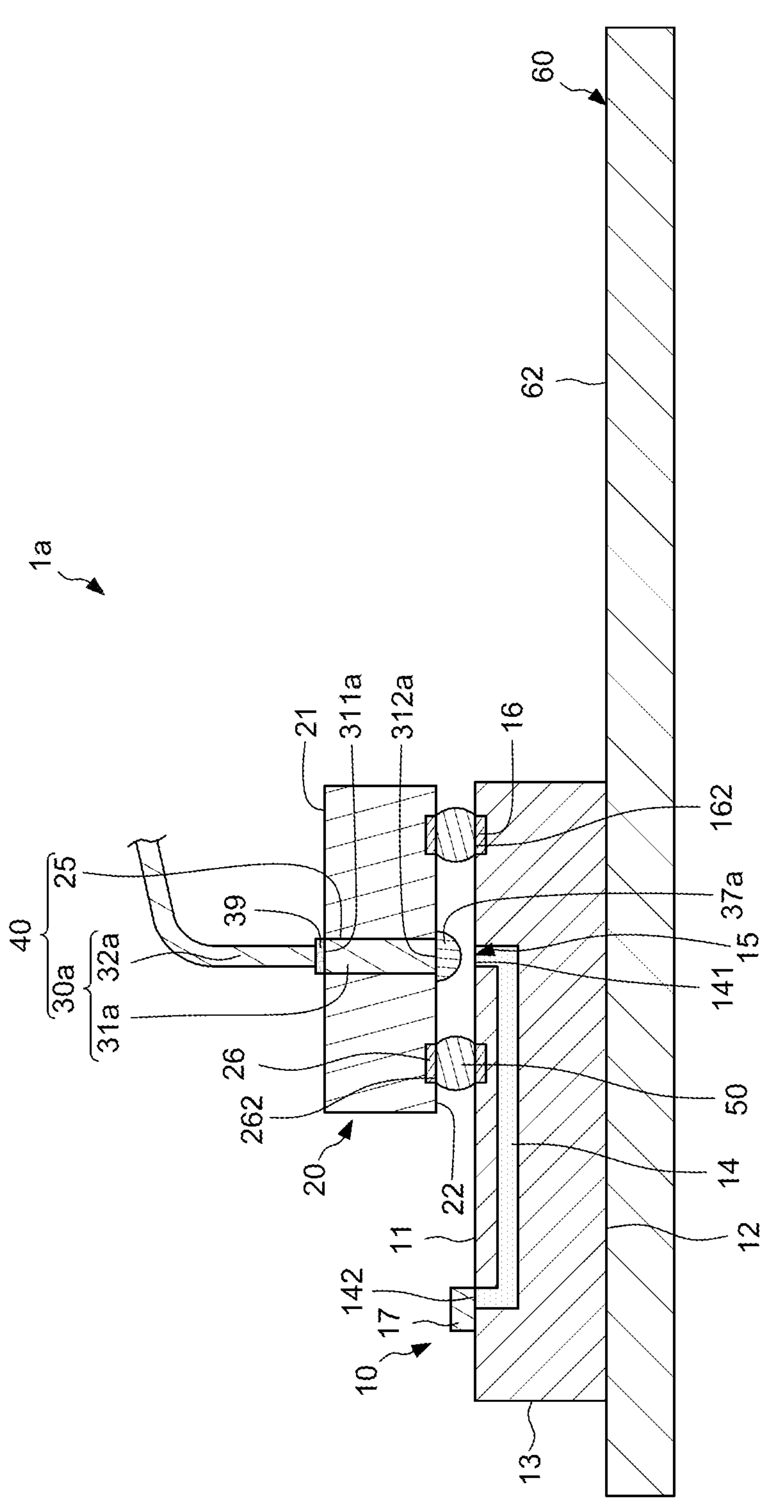
FIG. 4 illustrates a cross-sectional view of an optoelectronic package according to some embodiments of the present disclosure.

FIG. 4 illustrates a cross-sectional view of an optoelectronic package 1*a* according to some embodiments of the present disclosure. The optoelectronic package 1*a* of FIG. 4 is similar to the optoelectronic package 1 of FIG. 1, except for a structure of the light transmission element 30*a*. In some embodiments, as shown in FIG. 4, the light transmission element 30*a* may include an optical through silicon via (TSV) 31*a* and an optical fiber 32*a*. In some embodiments, the optical TSV 31*a* may be, for example, a silicon-base material. The optical TSV 31*a* may be formed or disposed in the through hole 25 of the alignment component 20. The optical TSV 31*a* may have a top surface 311*a* and a bottom surface 312*a* opposite to the top surface 311*a*. In some embodiments, the top surface 311*a* of the optical TSV 31*a* may be substantially coplanar with the upper surface 21 of the alignment component 20. The bottom surface 312*a* of the optical TSV 31*a* may be substantially coplanar with the lower surface 22 of the alignment component 20 and the bottom surfaces 262 of the plurality of alignment pads 26.

The optical fiber 32*a* may be coupled to the top surface 311*a* of the optical TSV 31*a*. In some embodiments, as shown in FIG. 4, an index matching material 39 may be disposed between the optical fiber 32*a* and the top surface 311*a* of the optical TSV 31*a* to increase a light coupling efficiency between the optical fiber 32*a* and the optical TSV 31*a*. In some embodiments, a lens structure 37*a* may be formed or disposed on the bottom surface 312*a* of the optical TSV 31*a* to increase a light coupling efficiency between the optical TSV 31*a* and the optical I/O 15 of the photonic structure 10. In some embodiments, the lens structure 37*a* and the optical TSV 31*a* may be formed concurrently. In some embodiments, a coupling manner between the optical TSV 31*a* and the optical I/O 15 may be, for example, grating coupling (e.g., using a grating coupler) or direct coupling. In some embodiments, the grating coupler (not shown) may be formed or disposed on the bottom surface 312*a* of the optical TSV 31*a*. In some embodiments, the grating coupler (not shown) may be formed or disposed on the optical I/O 15.

Figure 5:
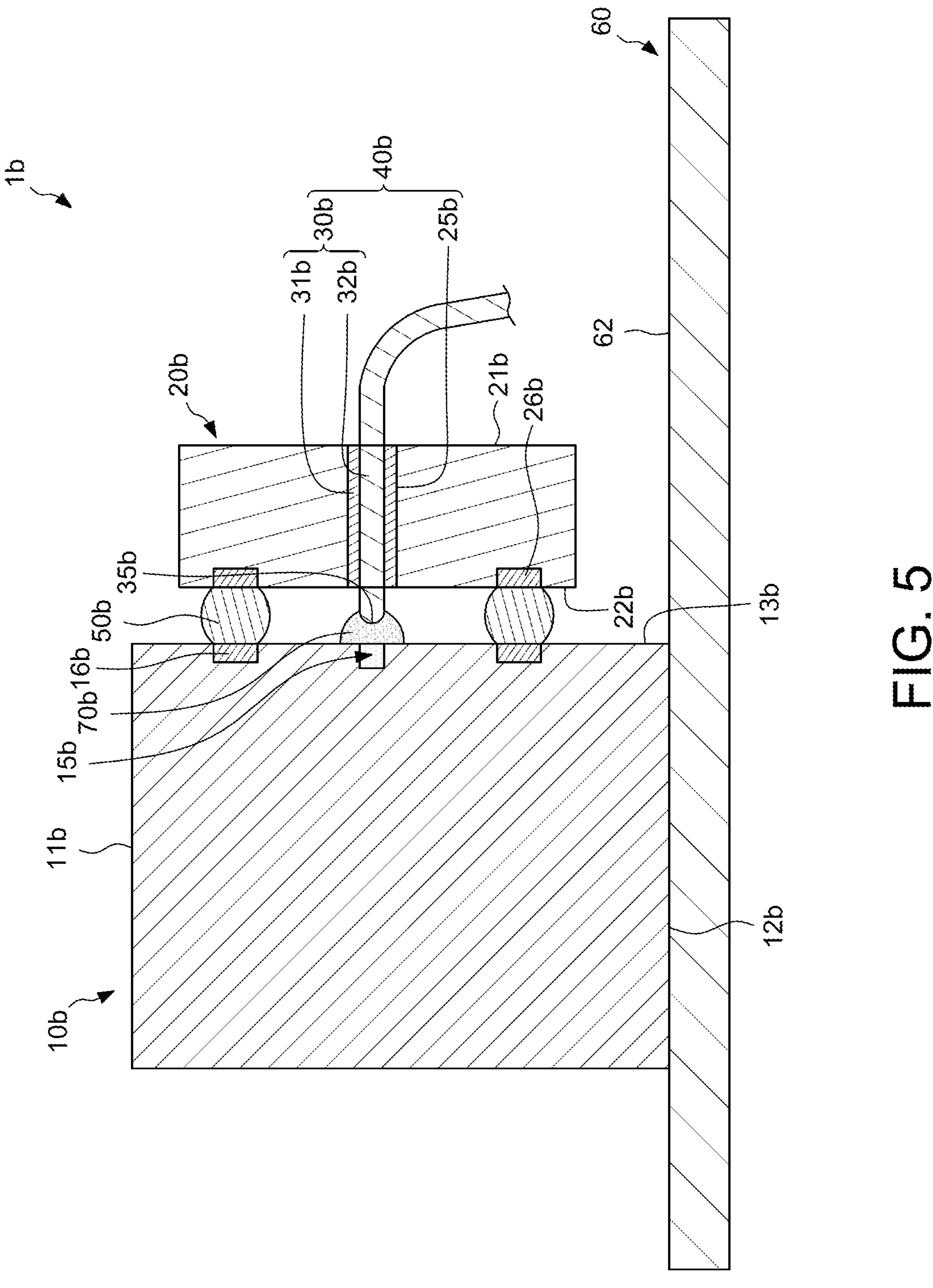
FIG. 5 illustrates a cross-sectional view of an optoelectronic package according to some embodiments of the present disclosure.

FIG. 5 illustrates a cross-sectional view of an optoelectronic package 1*b* according to some embodiments of the present disclosure. The optoelectronic package 1*b* of FIG. 5 is similar to the optoelectronic package 1 of FIG. 1, except for configurations of the photonic structure 10 *b* and the alignment component 20*b*. In some embodiments, as shown in FIG. 5, the optical I/O 15*b* and the plurality of bonding pads 16*b* of the photonic structure 10*b* may be exposed from the lateral surface (e.g., a second surface) 13*b* extending between the upper surface (e.g., a first surface) 11*b* and the lower surface (e.g., a third surface) 12*b*. The alignment component 20*b* of FIG. 5 may be a configuration after rotating the alignment component 20 of FIG. 1 by 90 degrees. That is, the bottom surface 22*b* and the plurality of alignment pads 26*b* of the alignment component 20*b* may face the lateral surface 13*b* of the photonic structure 10*b*. The first surface (e.g., the top surface) 62 of the carrier 60 may be substantially perpendicular to the lateral surface 13*b* of the photonic structure 10*b*. In addition, the light transmission channel 40*b* (including, for example, the through hole 25*b* of the alignment component 20*b* and the light transmission element 30*b* in the through hole 25*b*) of the alignment component 20*b* may be substantially parallel to the first surface (e.g., the top surface) 62 of the carrier 60. In some embodiments, as shown in FIG. 5, the light communication port 35*b* of the light transmission channel 40*b*, the coupling material 70*b* and the plurality of connectors 50*b* may be located between the lateral surface 13*b* of the photonic structure 10*b* and the second surface 22*b* of the alignment component 20*b*. The second surface 22*b* of the alignment component 20*b* is opposite to the first surface 21*b* of the alignment component 20*b*. The through hole 25*b* of the alignment component 20*b* extends between the first surface 21*b* and the second surface 22*b*. The light communication port 35*b* of the light transmission channel 40*b* may be aligned with the optical I/O 15*b* of the photonic structure 10*b* through the plurality of alignment pads 26*b* during the reflow process. The coupling material 70*b* may be disposed between the light communication port 35*b* of the light transmission channel 40*b* and the optical I/O 15*b* of the photonic structure 10*b*. The plurality of connectors 50 may connect the plurality of alignment pads 26*b* of the alignment component 20*b* to the plurality of bonding pads 16*b* exposed from the lateral surface 13*b* of the photonic structure 10*b*.

Figure 6:
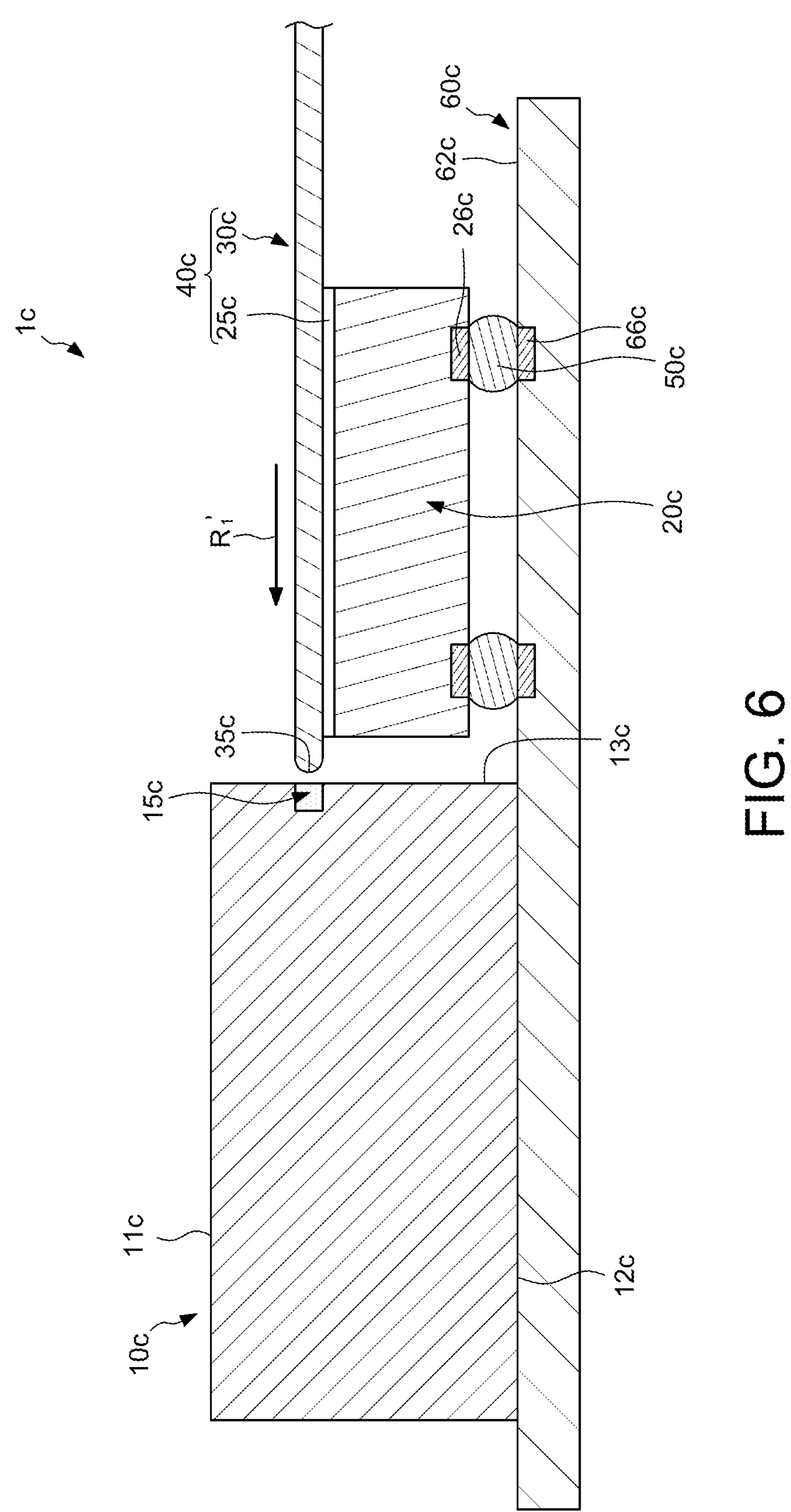
FIG. 6 illustrates a cross-sectional view of an optoelectronic package according to some embodiments of the present disclosure.
Figure 7:
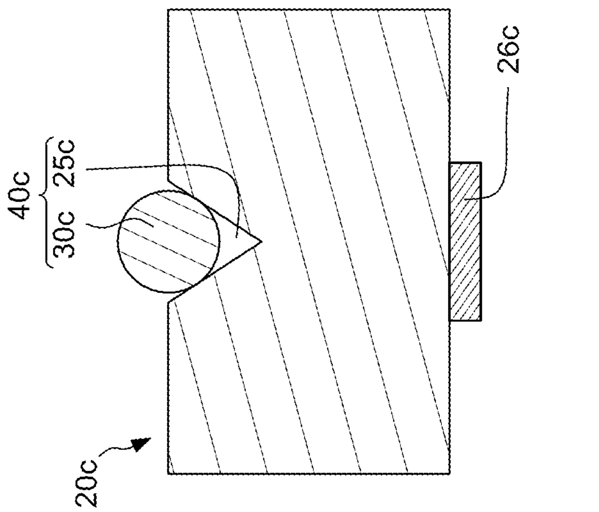
FIG. 7 illustrates a cross-sectional view of an alignment component according to some embodiments of the present disclosure.

FIG. 6 illustrates a cross-sectional view of an optoelectronic package 1*c* according to some embodiments of the present disclosure. FIG. 7 illustrates a cross-sectional view of an alignment component 20*c* according to some embodiments of the present disclosure. The optoelectronic package 1*c* of FIG. 6 is similar to the optoelectronic package 1 of FIG. 1, except for configurations of the photonic structure 10*c* and the alignment component 20*c* and a structure of the carrier 60*c*. In some embodiments, as shown in FIG. 6, the optical I/O 15*c* of the photonic structure 10*c* may be exposed from the lateral surface 13*c* extending between the upper surface 11*c* and the lower surface 12*c*. In addition, the photonic structure 10*c* of FIG. 6 omits the plurality of bonding pads 16 of FIG. 1. The carrier 60*c* may further include a plurality of bonding pads 66*c* exposed from the first surface (e.g., the top surface) 62*c* of the carrier 60*c*. The alignment component 20*c* may be located over the carrier 60*c*. That is, the carrier 60*c* may be configured to receive the photonic structure 10*c* and the alignment component 20*c*. In some embodiments, the alignment component 20*c* (e.g., the plurality of alignment pads 26*c*) may be electrically connected to the carrier 60*c* (e.g., the first surface 62*c*) through the plurality of connectors 50*c*. In some embodiments, as shown in FIG. 6 and FIG. 7, the alignment component 20*c* may include a V-groove 25*c* aligned with the optical I/O 15*c* of the photonic structure 10*c*. The light transmission element 30*c* may be disposed in the V-groove 25*c* to constitute a light transmission channel 40*c*. The alignment component 20*c* may align the light transmission channel 40*c* with the optical I/O 15*c* of the photonic structure 10*c* in a first direction $R_1$'. The first direction $R_1$' may be substantially parallel to the first surface (e.g., the top surface) 62*c* of the carrier 60*c*. In some embodiments, the light transmission channel 40*c* (including, for example, the V-groove 25*c* of the alignment component 20*c* and the light transmission element 30*c* in the V-groove 25*c*) may be aligned with the optical I/O 15*c* of the photonic structure 10*c* through the plurality of alignment pads 26*c* during the reflow process, lead to increased light coupling efficiency between a light communication port 35*c* of the light transmission channel 40*c* and the optical I/O 15*c* of the photonic structure 10*c* and decreased loss of the optical signal. In some embodiments, the light transmission channel 40*c* may include an extending direction that is substantially parallel to the first surface 62*c* of the carrier 60*c*. In some embodiments, the plurality of alignment pads 26*c* may be located on the alignment component 20*c* and between the light transmission channel 40*c* and the carrier 60*c*. In some embodiments, the arrangement of the plurality of alignment pads 26*c* of FIG. 6 may be the same as the arrangement of the plurality of alignment pads 26 of FIG. 3. The plurality of alignment pads 26*c* of FIG. 6 may be arranged in a second direction and a third direction that are same as the second direction $R_2$ and the third direction $R_3$ of FIG. 3, respectively. The extending direction of the light transmission channel 40*c* is not parallel to the second direction and the third direction. The plurality of connectors 50*c* may connect the plurality of alignment pads 26*c* of the alignment component 20*c* to the plurality of bonding pads 66*c* of the carrier 60*c*.

Figure 8:
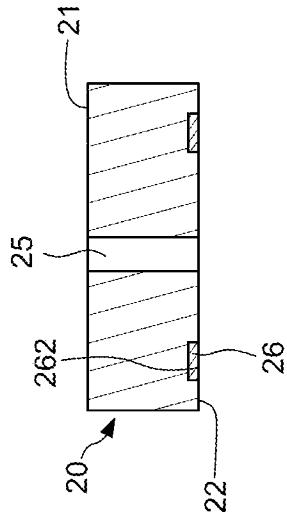
FIG. 8 illustrates one or more stages of an example of a method for manufacturing an optoelectronic package according to some embodiments of the present disclosure.
Figure 9:
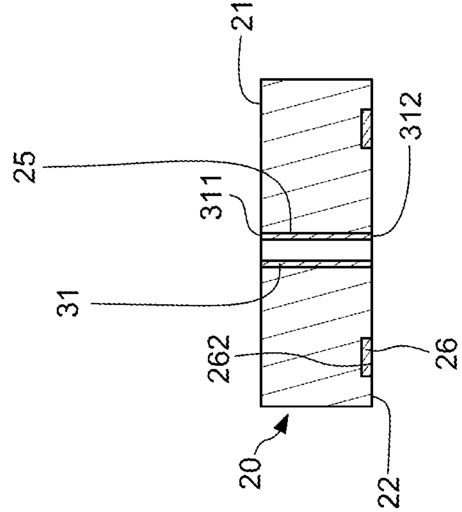
FIG. 9 illustrates one or more stages of an example of a method for manufacturing an optoelectronic package according to some embodiments of the present disclosure.
Figure 10:
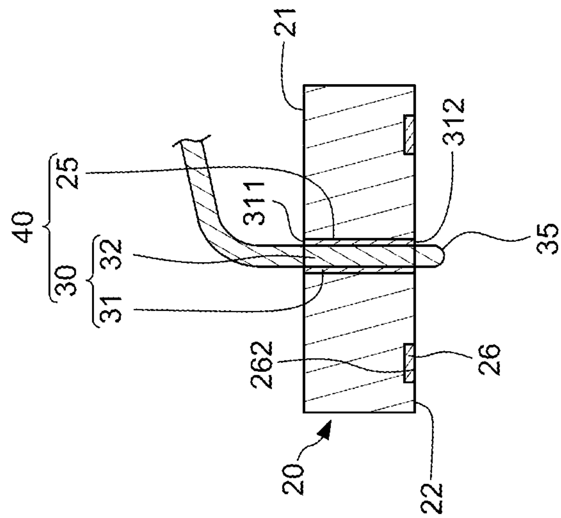
FIG. 10 illustrates one or more stages of an example of a method for manufacturing an optoelectronic package according to some embodiments of the present disclosure.

FIG. 8 through FIG. 10 illustrate a method for manufacturing an optoelectronic package according to some embodiments of the present disclosure. In some embodiments, the method is for manufacturing the optoelectronic package 1 shown in FIG. 1.

Referring to FIG. 8, an alignment component 20 is provided. The alignment component 20 of FIG. 8 may be the same as the alignment component 20 of FIG. 1. Thus, the alignment component 20 of FIG. 8 may include a through hole 25 and a plurality of alignment pads 26. The through hole 25 may extend through the alignment component 20 and in communication with an upper surface 21 and a lower surface 22 of the alignment component 20. The plurality of alignment pads 26 may be located on and exposed from the lower surface 22 of the alignment component 20.

Referring to FIG. 9 through FIG. 10, a light transmission element 30 is formed to entirely fill the through hole 25 of the alignment component 20. Referring to FIG. 9, a filling material 31 is formed in the through hole 25 of the alignment component 20. The filling material 31 of FIG. 9 may be the same as the filling material 31 of FIG. 1. Referring to FIG. 10, an optical fiber 32 extends through the filling material 31 to form the light transmission element 30. The optical fiber 32 of FIG. 10 may be the same as the optical fiber 32 of FIG. 1. The light transmission element 30 and the through hole 25 of the alignment component 20 may constitute a light transmission channel 40. The light transmission channel 40 (including, for example, the light transmission element 30 and the through hole 25 of the alignment component 20) may include a light communication port 35 located outside the through hole 25 of the alignment component 20.

Referring to FIG. 1, the assembly of the light transmission channel 40 and the alignment component 20 is connected to the photonic structure 10 through a plurality of connectors 50. In some embodiments, the light communication port 35 of the light transmission channel 40 is aligned with an optical I/O 15 of a photonic structure 10 through the plurality of alignment pads 26 of the alignment component 20 during a reflow process. The photonic structure 10 is formed or disposed on a carrier 60.

After the reflow process, the alignment component 20 is bonded to the photonic structure 10 to obtain the optoelectronic package 1 of FIG. 1.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be deemed to be "substantially" the same or equal to a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Two surfaces can be deemed to be coplanar or substantially coplanar if a displacement between the two surfaces is no greater than 5 μm, no greater than 2 μm, no greater than 1 μm, or no greater than 0.5 μm. A surface can be deemed to be substantially flat if a displacement between a highest point and a lowest point of the surface is no greater than 5 μm, no greater than 2 μm, no greater than 1 μm, or no greater than 0.5 μm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optoelectronic package, comprising:

a photonic structure including an upper surface and a waveguide embedded therein and disposed adjacent to the upper surface, wherein the waveguide has a first port exposed from the upper surface and configured to couple an optical signal, and a second port opposite to the first port and exposed from the upper surface;

a component fixing a light transmission channel and aligning the light transmission channel with the first port of the waveguide through a plurality of alignment pads on the component, wherein the light transmission channel includes a light communication port aligned with the first port of the waveguide;

a coupling material disposed between the light communication port and the first port of the waveguide; and an optoelectronic component coupled with the second port of the waveguide, wherein the optoelectronic component horizontally overlaps the light communication port of the light transmission channel and the coupling material.

2. The optoelectronic package of claim 1, wherein one of the plurality of alignment pads vertically overlaps a portion of the waveguide.

3. The optoelectronic package of claim 1, wherein the waveguide includes a horizontal portion connected to the first port and the second port, the photonic structure further includes a plurality of bonding pads disposed adjacent to the upper surface, and one of the plurality of bonding pads vertically overlaps a portion of the horizontal portion.

4. The optoelectronic package of claim 3, wherein the horizontal portion of the waveguide extends along an extending direction that is substantially parallel to the upper surface of the photonic structure.

5. An optoelectronic package, comprising:

a carrier including a first surface;

a photonic structure disposed on the first surface of the carrier and including an optical I/O, wherein the photonic structure has an upper surface, a lower surface opposite to the upper surface, and a lateral surface extending between the upper surface and the lower surface, wherein the optical I/O is exposed from the lateral surface, and the optical I/O includes an optical surface aligned with the lateral surface of the photonic structure;

a component aligning a light transmission channel with the optical I/O of the photonic structure in a first direction that is substantially parallel to the first surface of the carrier, wherein the light transmission channel includes a light communication port horizontally aligned with the optical I/O of the photonic structure, and wherein the optical surface of the optical I/O faces the light transmission channel;

a coupling material disposed between the light communication port and the optical I/O and vertically overlapping a portion of the carrier; and a plurality of connectors connecting a plurality of alignment pads of the component to a plurality of bonding pads exposed from the lateral surface of the photonic structure, wherein the coupling material vertically overlaps the plurality of connectors.

6. The optoelectronic package of claim 5, wherein the component includes a plurality of alignment pads electrically connected to the carrier and vertically overlapping portions of the light transmission channel.

7. The optoelectronic package of claim 6, wherein the component further includes a V-groove horizontally aligned with the optical I/O of the photonic structure, and wherein the plurality of alignment pads vertically overlap portions of the V-groove.

* * * * *